April 4, 1950 H. E. HART 2,502,946
ALIGNMENT ATTACHMENT FOR AXLE ASSEMBLIES
Filed Feb. 11, 1949 3 Sheets-Sheet 1

Inventor
Horace E. Hart
By *Clarence A. O'Brien and Harvey B. Jacobson*
Attorneys April 4, 1950     H. E. HART     2,502,946
ALIGNMENT ATTACHMENT FOR AXLE ASSEMBLIES
Filed Feb. 11, 1949     3 Sheets-Sheet 2
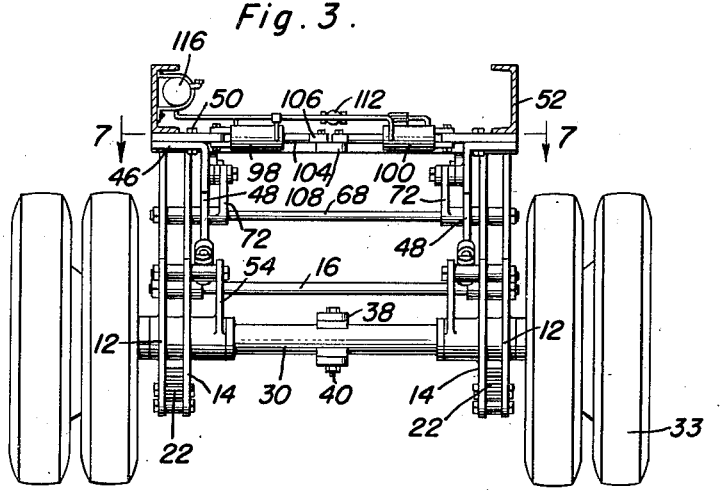
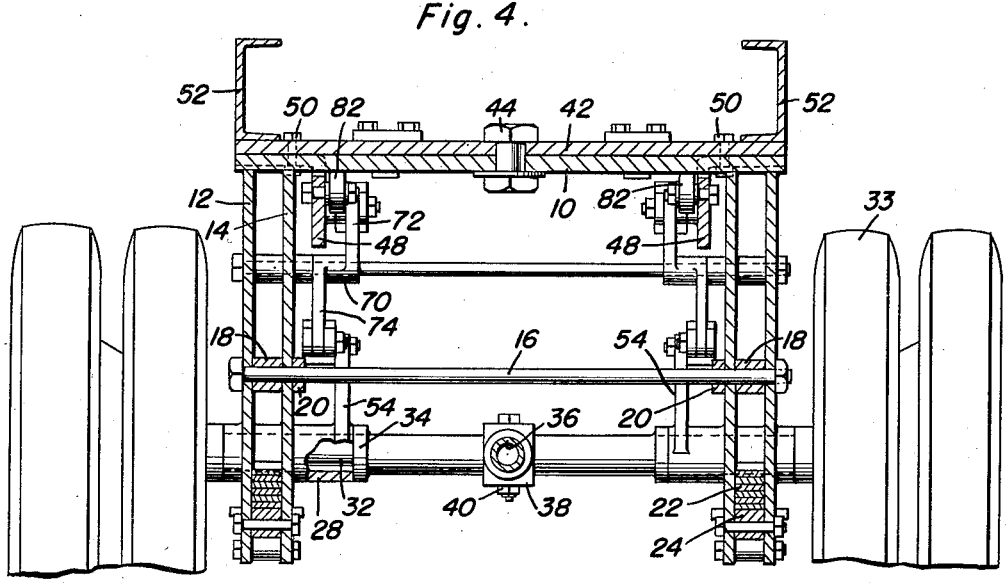
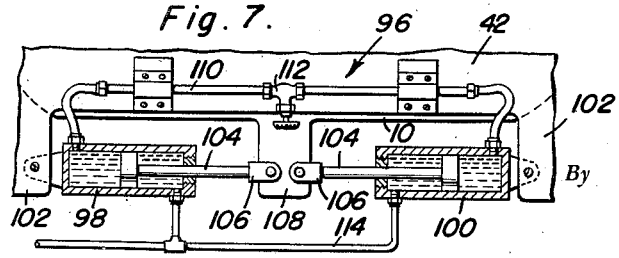
Inventor
Horace E. Hart April 4, 1950 H. E. HART 2,502,946
ALIGNMENT ATTACHMENT FOR AXLE ASSEMBLIES
Filed Feb. 11, 1949 3 Sheets-Sheet 3

Inventor
Horace E. Hart
By Clarence A. O'Brien
and Harvey B. Jackson
Attorneys

Patented Apr. 4, 1950

2,502,946

UNITED STATES PATENT OFFICE 2,502,946

ALIGNMENT ATTACHMENT FOR AXLE ASSEMBLIES

Horace E. Hart, Abilene, Tex.

Application February 11, 1949, Serial No. 75,838

9 Claims. (Cl. 280—104.5)

This invention relates to new and useful improvements in swingable axle constructions for trailers and the primary object of the present invention is to provide an alignment attachment for retaining the axles or axle of a two or more axle trailer or truck in alignment with the towing vehicle or tractor in order to prevent tire scuffing and unnecessary drag.

Another important object of the present invention is to provide a wheeled frame including forward and rear axles and embodying novel and improved means joining the axles whereby the rear axle will swing in response to a turning of the forward axle.

Yet another important object of the present invention is to provide an alignment attachment for the axle assemblies of trailers and the like embodying a pair of pivotally connected and relatively rotatable plates permitting one plate to rotate or revolve against the other plate, which in turn is secured to the trailer frame so that turning or changing relation of plates is effected by the towing vehicle for moving the axles supported by one of the plates.

A further object of the present invention is to provide a fifth wheel for trailers including a pair of relatively rotatable, pivotally joined plates and a novel and improved hydraulic snubbing mechanism connecting the plates.

Another feature of the present invention is to provide an alignment attachment for axle assemblies including a pair of pivotally connected plates which are rotatable with respect to each other and incorporating a novel and improved stabilizing mechanism between the said plates.

A still further aim of the present invention is to provide an alignment attachment for the axle assemblies of trailers that is simple and practical in construction; strong and reliable in use; neat and attractive in appearance; highly efficient and effective in operation; small and compact in structure; relatively inexpensive to manufacture, service and install; and, otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is an end view of Figure 2;

Figure 4 is an enlarged, fragmentary, transverse vertical sectional view taken substantially on the plane of section line 4—4 of Figure 2;

Figure 7 is a fragmentary horizontal sectional view taken substantially on the plane of section line 7—7 of Figure 3.

Figure 1:
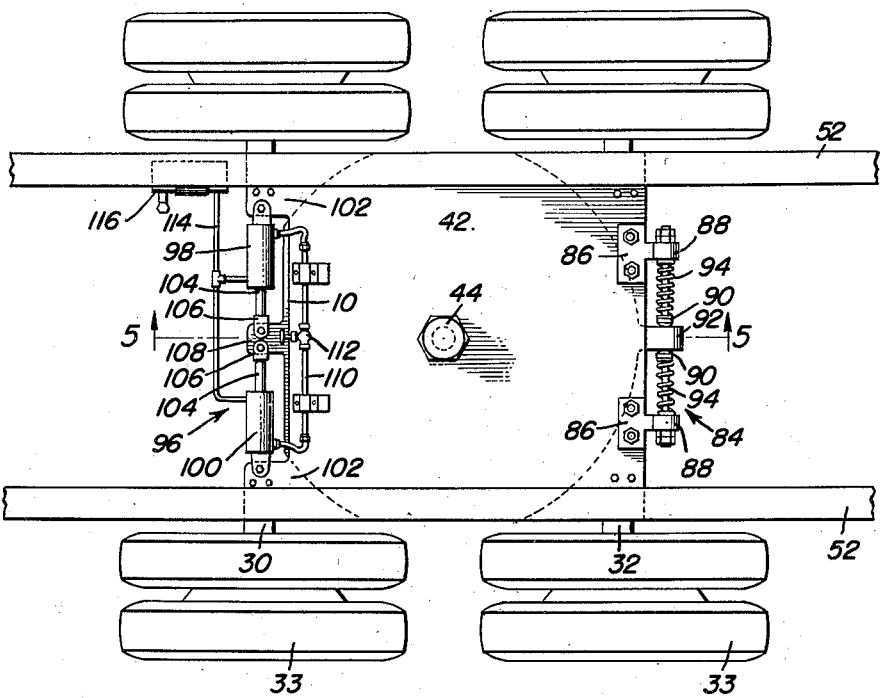
Figure 1 is a top plan view of the present invention and showing the side frame members in part.
Figure 2:
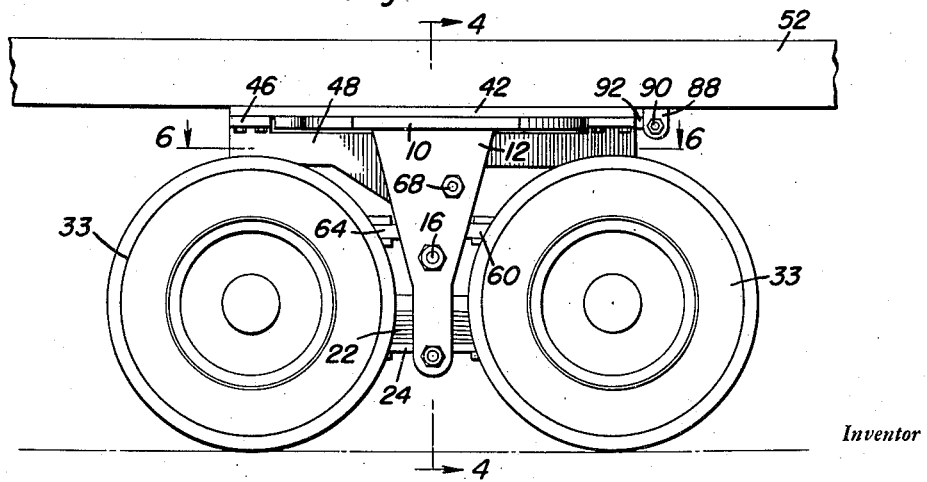
Figure 2 is a side elevational view of Figure 1.
Figure 5:
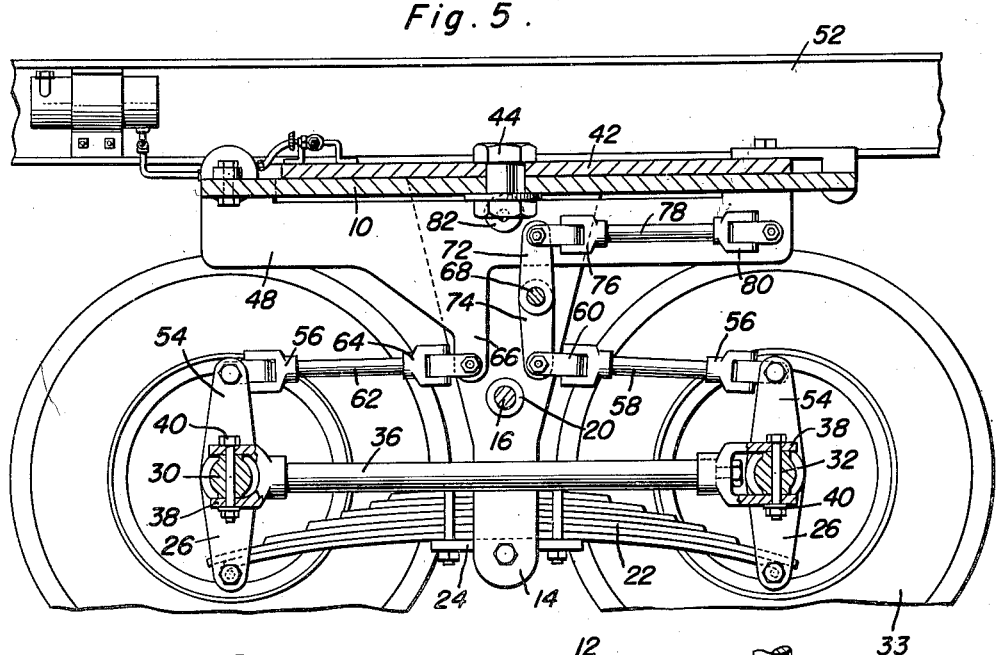
Figure 5 is an enlarged, fragmentary, longitudinal vertical sectional view taken substantially on the plane of section line 5—5 of Figure 1.
Figure 6:
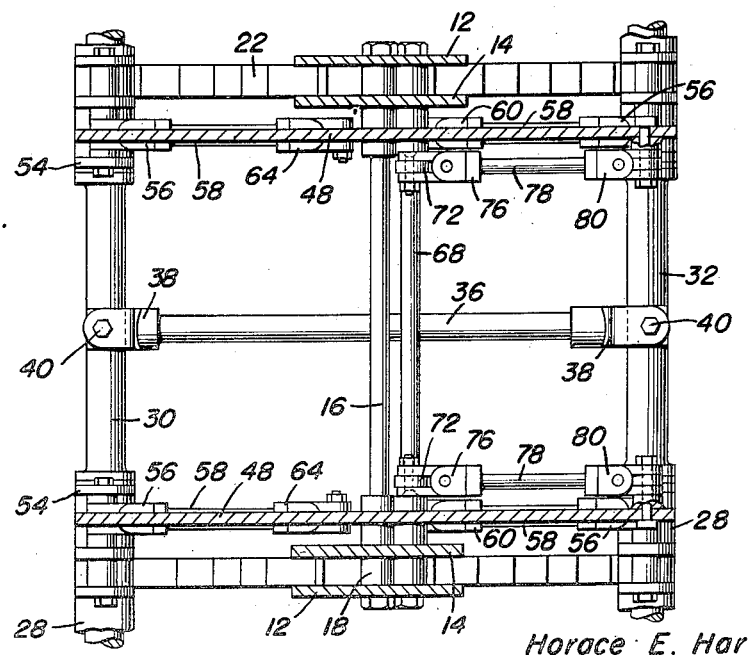
Figure 6 is an enlarged, fragmentary, horizontal sectional view taken substantially on the plane of section line 6—6 of Figure 2.

Referring now to the drawings in detail, wherein for the purpose of illustration, there is disclosed a preferred embodiment of the present invention, the numeral 10 represents a lower plate from adjacent the side edges of which there depends pairs of side walls or supports 12 and 14. The side walls are suitably fixed to the undersurface of the lower plate, by welding or the like, and are joined by a cross bolt 16.

Spacer sleeves 18 embrace the bolt 16 and are disposed between the pairs of side walls 12 and 14 to retain the side walls spaced relative to each other, and abutments or stops 20 fixed on the bolt 16 limit relative movement of the bolt and side walls.

Longitudinal leaf springs 22 are disposed between each pair of side walls 12 and 14 and are held to the side walls by suitable brackets 24 that prevent movement of the leaf springs relative to the side walls.

The ends of the leaf springs 22 are fixed between pairs of ears 26 which in turn are secured to collars 28 embracing forward and rear axles 30 and 32 holding wheels 33. Stops 34 fixed on the axles prevent longitudinal movement of the collars and thereby retain the same spaced relative to each other.

A cross member 36 extends between the central portions of the axles 30 and 32 and includes terminal bifurcations 38 which embrace and are pivotally secured to the axles by fasteners or the like 40.

An upper plate 42 bears upon the lower plate 10 and is pivoted to the lower plate by a kingpin or bolt 44 that extends through central openings in the said plates. The upper plate 42 is detachably secured to the angulated portions 46 of a pair of side members 48 by fasteners or the like 50 and the side members are spaced between the pairs of side walls.

The upper plate 42 also supports a pair of side frame members or beams 52 that are fixed to the upper surface of the plate 42 by welding or the like and are suitably secured to a trailer body (not shown).

Projecting laterally from the collars 28 is a plurality of vertical arms or fulcrums 54 that support universal joints or couplings 56. The universal joints associated with the rear axle 32 are applied to rear links 58 the free ends of which carry further universal couplings 60 and the universal joints associated with the forward axle 30 are connected to forward links 62 having still further universal couplings 64 at their free ends which are secured to extensions 66 projecting from the side members 48.

A shaft or bolt 68 extends between the pairs of side walls 12 and 14 and receives collars 70 having diametrically opposed laterally projecting and spaced arms 72 and 74. The arms 74 are secured to the joints 60 and the arms 72 are secured to universal couplings 76 supporting upper rear links 78. The free ends of the upper rear links 78 support universal couplings 80 that are secured to the rear ends of the side members 48.

Removably secured to and projecting from the inner faces of the side members 48, are rollers 82 that bear against the undersurface of the lower plate 10 to prevent side sway that might occur due to wear between the plates 10 and 42.

Means is provided for normally retaining the plates 10 and 42 against relative rotation, and this means comprises a stabilizing unit designated generally by the numeral 84. The unit 84 includes a pair of spaced brackets 86 detachably secured to the rear edge of the upper plate 42 and having rearwardly extending sleeves 88 that slidably or loosely receive bolts 90. The heads of the bolts 90 are secured to a rearwardly extending ear or tongue 92 fixed to the lower plate 10, and coil springs 94 embrace the bolts 90 and are biased between the sleeves 88 and the heads of the bolts to normally space the sleeves 88 from the tongue 92.

A snubbing mechanism, designated generally by the numeral 96, forms a connection between the upper and lower plates 10 and 42 and comprises a pair of pump cylinders 98 and 100 that are pivoted on forward extensions 102 of the upper plate 42. The cylinders include piston rods 104 the free outer ends of which support connecting elements 106 that are pivotally secured to a forward extension 108 of the lower plate 10.

The cylinders 98 and 100 are connected by a conduit 110 and a manually operated valve 112 controls the conduit 110. The valve is employed to lock the complete assembly or for the purpose of adjusting the flow of fluid from one cylinder to the other, snubbing to any degree desired.

The cylinders are also connected by an outlet conduit 114 that leads to an overflow tank or reservoir 116.

In practical use of the present invention, the frame members 52 will turn in response to the turning of a vehicle or tractor towing the frame members. As the frame members 52 turn, the upper plate 42 will also turn or rotate about the pivot pin 44 whereupon one of the side members 48 will move forwardly and the other of the side members will move rearwardly, depending of course, whether a right or left hand turn is being made.

The forwardly moving of the side members 48 will also cause the links 62 and 78, attached thereto, to move forwardly and the rearwardly moving of the side members 48 will cause the links 62 and 78, attached thereto, to move rearwardly.

The forwardly moving link 78 will impart a rearward movement to link 58 attached thereto by the arms 72 and 74 whereas the rearwardly moving link 78 will impart a forward movement to the link 58 attached thereto by the arms 72 and 74. Through this arrangement, and due to the leverage action of the arms 72 and 74 (rocking about the shaft 68) associated with each of the links 78 and 76, the rear axle 32 will also swing with the forward axle and at a greater rate than the forward axle causing both axles to be in the same relative radius position when a complete turn is made.

Although the above description has been limited to a trailer construction, obviously the same could be used on a truck without deviating from the function of the instant structure.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. An alignment attachment for trailer axle assemblies comprising upper and lower plates pivotally joined for relative rotation, a forward axle connected to the upper plate, a rear axle connected to the lower plate and to the upper plate, means connecting the axles for swinging movement relative to each other, said rear axle swinging in response to a swinging movement to said forward axle, means normally holding the plates against relative movement, and a hydraulic snubbing mechanism between the upper and lower plates, said snubbing mechanism including a means for locking the plates in selected pivotal position.

2. The combination of claim 1 wherein said means for locking the plates in selected pivotal position includes a valve.

3. An alignment attachment for trailer axle assemblies comprising upper and lower plates pivotally joined for relative rotation, a forward axle connected to the upper plate, a rear axle connected to the lower plate and to the upper plate, means connecting the axles for swinging movement relative to each other, said rear axle swinging in response to a swinging movement to said forward axle, means normally holding the plates against relative movement, a pair of pump cylinders mounted on said upper plate and having piston rods connected to said lower plate, said pump cylinders having fluids therein, the fluid in one pump cylinder being discharged to the other pump cylinder upon relative rotation of the two plates.

4. The combination of claim 3 and a manually operated valve for controlling the flow of fluid between the pump cylinders and locking the plates in selected relative rotated position.

5. The combination of claim 3 wherein said means normally holding the plates against relative movement includes a spring connection between said plates.

6. The combination of claim 3 wherein said rear axle swings at an accelerated rate of movement with respect to the forward axle.

7. The combination of claim 3 and means preventing side sway of the plates relative to each other.

8. The combination of claim 7 wherein said means includes a plurality of side members fixed to said upper plate, and rollers mounted on said side members and bearing against the undersurface of said lower plate.

9. An alignment attachment for trailer axle assemblies comprising upper and lower plates, a pair of side walls fixed to and depending from the lower plate, longitudinally extending springs mounted on the side walls, forward and rear axles secured to the springs, means joining the axles for relative swinging movement, means pivotally joining the plates for relative rotary movement, side members depending from the upper plate, first links connecting the forward axle to the side members, second links connecting the rear axle to the side walls, further links connecting the second links to the side members, means restricting relative rotation of the plates, and a snubbing mechanism between the plates.

HORACE E. HART.

REFERENCES CITED

The following references are of record in the file of this patent:

UNITED STATES PATENTS

| Number | Name | Date |
|---|---|---|
| 1,940,798 | Hanna | Dec. 26, 1933 |